US006986041B2

(12) United States Patent
Gilfix et al.

(10) Patent No.: US 6,986,041 B2
(45) Date of Patent: Jan. 10, 2006

(54) SYSTEM AND METHOD FOR REMOTE CODE INTEGRITY IN DISTRIBUTED SYSTEMS

(75) Inventors: Michael A. Gilfix, Austin, TX (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 10/383,852

(22) Filed: Mar. 6, 2003

(65) Prior Publication Data

US 2004/0177260 A1    Sep. 9, 2004

(51) Int. Cl.
     *H04L 9/00*    (2006.01)
(52) U.S. Cl. .................................... 713/161
(58) Field of Classification Search ............ 705/67; 709/201, 203; 380/278, 279, 44; 713/161
     See application file for complete search history.

(56) References Cited

U.S. PATENT DOCUMENTS

| 4,558,176 | A | * | 12/1985 | Arnold et al. ............ 713/190 |
| 5,343,527 | A | | 8/1994 | Moore ........................ 380/4 |
| 5,666,411 | A | * | 9/1997 | McCarty ..................... 705/51 |
| 6,002,772 | A | * | 12/1999 | Saito ........................ 705/58 |
| 6,058,484 | A | * | 5/2000 | Chapman et al. ......... 713/202 |
| 6,105,137 | A | | 8/2000 | Graunke et al. .......... 713/201 |
| 6,122,738 | A | | 9/2000 | Millard ..................... 713/187 |
| 6,141,683 | A | | 10/2000 | Kraml et al. ............ 709/220 |
| 6,195,432 | B1 | * | 2/2001 | Takahashi et al. ........ 380/277 |
| 6,341,373 | B1 | | 1/2002 | Shaw ....................... 717/11 |
| 6,460,423 | B1 | * | 10/2002 | Keller et al. ............ 73/862.49 |
| 2002/0087668 | A1 | | 7/2002 | San Martin et al. ..... 709/221 |
| 2002/0138554 | A1 | | 9/2002 | Feigen et al. ............ 709/203 |

FOREIGN PATENT DOCUMENTS

WO    WO 02/19075 A2    3/2002

OTHER PUBLICATIONS

Schneier et al., "Remote Auditing of Software Outputs Using a Trusted Coprocessor", Jul. 1997.

* cited by examiner

*Primary Examiner*—Gregory Morse
*Assistant Examiner*—Thomas Ho
(74) *Attorney, Agent, or Firm*—VanLeeuwen & VanLeeuwen; Joseph T. VanLeeuwen; Mark S. Walker (57) ABSTRACT

A system and method for remote code integrity in distributed systems is presented. A server sends encrypted remote code to a client. The client receives the encrypted remote code and a key agent from the server. The key agent includes a key to decrypt the remote code. The client uses the key to decrypt the encrypted remote code and stores the decrypted remote code in internal memory. The key agent uses a second key included in the key agent to re-encrypt the decrypted remote code and stores the re-encrypted remote code in non-volatile memory. The client executes the decrypted remote code located in internal memory. Once the client is finished executing the decrypted remote code, the client overwrites the keys and deletes the old encrypted code.

12 Claims, 7 Drawing Sheets

SYSTEM AND METHOD FOR REMOTE CODE INTEGRITY IN DISTRIBUTED SYSTEMS

BACKGROUND OF THE INVENTION

1. Technical Field

The present invention relates in general to a system and method for remote code integrity in distributed systems. More particularly, the present invention relates to a system and method for decrypting the remote code using a first key, invoking the decrypted remote code, and re-encrypting the remote code using a second key.

2. Description of the Related Art

Businesses develop computer systems to exchange information between groups within the same business and between external groups, such as vendors or customers. Different groups may be located in close proximity or the different groups may be located at distant locations. For example, a business may have some groups located within a building complex and may have other groups located in a different country. Computer systems developed to exchange information between groups typically employ a distributed computer system.

A distributed computer system is a type of computing environment in which different components and objects comprising an application are located on different computers connected to a computer network. Distributed computer system equipment communicate with each other and exchange information over a computer network. Distributed computer systems typically use one or more servers to communicate with one or many clients that employ remote code installations. The remote components are trusted to deliver accurate information to the server. A challenge found, however, is that the integrity of a remote code installation is rarely verified.

Code de-compilation has been a concern of many businesses. Once remote code is de-compiled at a remote client, a programmer with remote client access may modify the remote code and maliciously change the remote code's functionality. Existing solutions may use encryption keys to protect the remote code at the remote client. However, the remote code is decrypted and stored in a nonvolatile storage area which makes the code vulnerable to malicious attacks. It is imperative to verify the integrity of the remote code in order to ensure proper functioning of the distributed computer system since the remote code may be altered transparent to a central server.

What is needed, therefore, is a system and method that protects remote code from being altered and notifies a server if a malicious attack to the remote code is detected.

SUMMARY

It has been discovered that the aforementioned challenges are resolved by using a first key to decrypt encrypted remote code, temporarily executing the decrypted remote code, and re-encrypting the remote code using a second key. A server encrypts remote code using a first key and sends the encrypted remote code to a client. The server also sends a key agent to the client wherein the key agent includes the first key and a second key. The key agent decrypts the encrypted remote code using the first key, stores the decrypted remote code in a temporary storage area, and re-encrypts the remote code using the second key.

After the client is finished executing the remote code, the remote code is removed and the encryption keys are overwritten. The next time the client wishes to execute the remote code, the client receives a second key agent from the server wherein the second key agent includes the second key to decrypt the re-encrypted data. The second key agent also includes a third key that the client uses to re-encrypt the remote code.

The server and the client are part of a distributed computer system in which the client and the server exchange information. For example, the server may be a central banking server in which the server collects customer transactions from a client that is located at a remote bank branch. The server sends the encrypted remote code and a start agent to the client in which the client stores in a non-volatile storage area.

When the client wishes to run the encrypted remote code, the client invokes the start agent which establishes a secure connection with the server using technology such as Secure Socket Layers (SSL). The client authenticates the server using standard authentication techniques. For example, the client may authenticate the server using a signature or digital certificate. Once the client authenticates the server, the server generates a key agent and sends the key agent to the client. The key agent includes a first key and a second key wherein the first key corresponds to a key that was used to encrypt the remote code. The first key may be identical in the case of symmetrical encryption or the key may be different in the case of asymmetrical encryption. The client receives the key agent and invokes the key agent in order to decrypt the encrypted code.

The key agent retrieves the encrypted remote code from the non-volatile storage area and decrypts the encrypted remote code using the first key. The key agent verifies the decrypted remote code in order to determine whether the remote code has been previously altered. If the remote code was previously altered, the decrypted remote code will include errors. The key agent verifies the decrypted remote code by loading the decrypted remote code using a Java classloader. The Java classloader initiates a byte-code verification process while loading the decrypted code. If the loading process fails, the decrypted remote code includes errors which indicate that the remote code has been altered.

If the decrypted remote code passes verification, the key agent stores the decrypted remote code in temporary storage location, such as a loaded class in a Java Virtual Machine (JVM). If the decrypted remote code failed verification, the key agent sends an error message to the server indicating that the remote code has been altered.

The key agent uses the second key to re-encrypt the remote code and stores the re-encrypted code in a non-volatile storage area. Once the decrypted remote code has been successfully re-encrypted, the key agent overwrites the second key and deletes the old encrypted data. The next time the client wishes to invoke the remote code, the client receives a second key agent from the server and decrypts the stored re-encrypted remote code using keys included in the second key agent.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
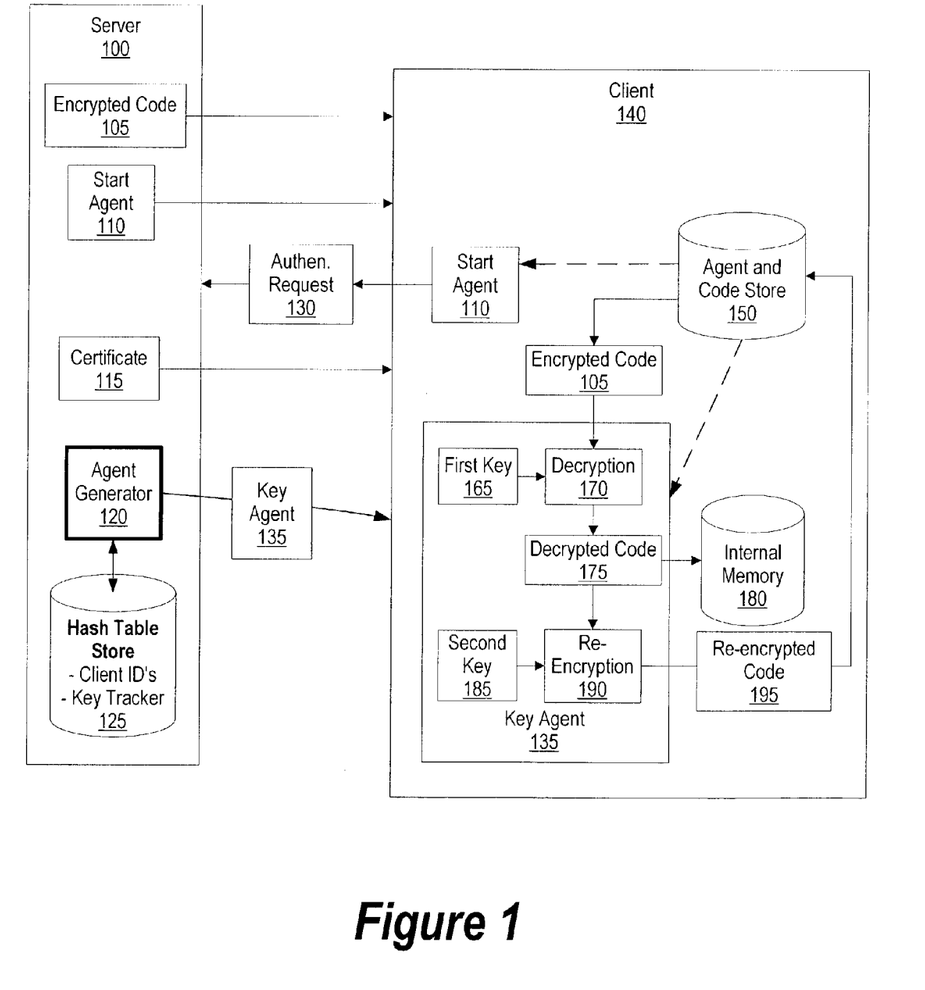
FIG. 1 is a diagram showing a client decrypting remote code using a first key, placing the decrypted remote code in a volatile storage area, and re-encrypting the remote code using a second key.

FIG. 1 is a diagram showing a client decrypting remote code using a first key, storing the decrypted remote code in internal memory, and re-encrypting the remote code using a second key. Server 100 and client 140 are part of a distributed computer system in which client 140 and server 100 exchange information. For example, server 100 may be a central banking server in which server 100 collects customer transactions from client 140 which is located in a remote bank branch. Server 100 includes encrypted code 105 that includes remote code that was encrypted using a first key. The encryption mechanism used to generate encrypted code 105 may be a symmetric encryption technique (e.g. AES, DES, Blowfish, etc.), or an asymmetric encryption technique (e.g. RSA).

Client 140 receives encrypted code 105 and start agent 110 from server 100 and stores them in data store 150. Start agent 110 is a boot up program that client 140 invokes when client 140 wishes to run the remote code included in encrypted code 105. Data store 150 may be stored on a non-volatile storage area, such as a computer hard drive.

When client 140 wishes to run the remote code included in encrypted code 105, client 140 invokes start agent 110 which establishes a secure connection with server 100 by using a technology such as Secure Socket Layers (SSL). Start agent 110 sends authentication request 130 to server 100 in order to authenticate server 100. Server 100 receives authentication request 130 and sends certificate 115 to client 140. Certificate 115 includes information that authenticates server 100. For example, certificate 115 may include a digital certificate corresponding to the X.509 standard. Client 140 receives certificate 115 and authenticates server 100 using standard verification procedures (i.e. consulting a signing authority for authentication).

Once client 140 authenticates server 100, server 100 uses agent generator 120 to generate key agent 135. Agent generator 120 retrieves a first key and a second key from hash table store 125 and generates key agent 135. The first key corresponds to the first key that was used when previously encrypting the remote code that resulted in encrypted code 105 (see FIGS. 2, 3, and corresponding text for further details regarding key agent generation). Server 100 sends key agent 135 to client 140 using the previously established secure (SSL) connection. Client 140 receives key agent 135 and invokes key agent 135 by calling a method of an interface that key agent 135 adheres, such as AgentInterface which is described below:

```
public interface AgentInterface {
    /*decrypts and runs jar file without storing decrypted
    code in non-volatile memory
    \* returns –1 if error in decryption or execution
    returns 0 if program loaded and running
    */
    public int init (String filename) {
        . . .
    }
}
```

Key agent 135 retrieves encrypted code 105 from data store 150. Key agent 135 uses decryption process 170 and first key 165 to decrypt encrypted code 105 which results in decrypted code 175. Decryption process 170 is a decryption mechanism corresponding to the encryption mechanism used to generate encrypted code 105 at server 100. For example, processing may use a symmetric encryption technique (e.g. AES, DES, Blowfish, etc.), or an asymmetric encryption technique (e.g. RSA).

In one embodiment, key agent 135 re-encrypts encrypted code 105 using second key 185 prior to decrypting encrypted code 105 using first key 165. In this embodiment, key agent 135 uses second key 185 and first key 165 to decrypt encrypted code 105.

Key agent 135 determines whether the remote code included in encrypted code 105 has been altered by verifying decrypted code 175. For example, if the remote code was altered, decrypted code 175 will include errors. In one embodiment, key agent 135 uses a Java classloader to load decrypted code 175 which executes a byte-code verification process during the loading process. If the loading process fails, the decryption process has failed which indicates that the remote code has been altered.

Once decrypted code 175 is verified, key agent 135 stores decrypted code 175 in internal memory 180. Internal memory 180 may be stored on a volatile storage area, such as a loaded class inside a Java Virtual Machine (JVM). If decrypted code 175 was not verified, key agent 135 sends an error message to server 100 indicating that the decrypted remote code has been altered.

Key agent 135 uses re-encryption 190 and second key 185 to re-encrypt decrypted code 175. Re-encryption 190 is an encryption mechanism corresponding to the encryption mechanism used to encrypt the remote code at server 100. Key agent 135 stores re-encrypted code 195 in data store 150 and sends a message to server 100 indicating that the remote code has been re-encrypted. Re-encrypted code 195 is used at client 140 the next time that client 140 wishes to execute the remote code. In other words, re-encrypted code 195 proceeds through the same decryption, verification, and re-encryption steps at client 140 as described above.

Figure 2:
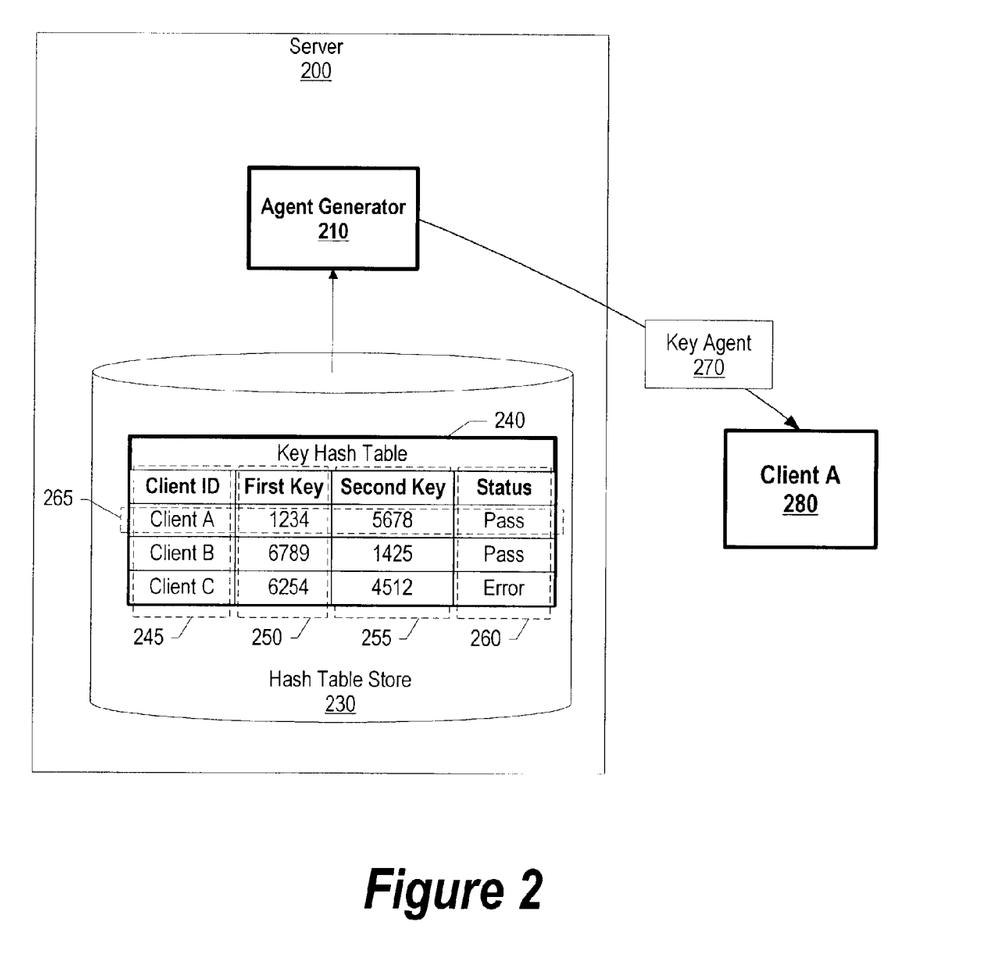
FIG. 2 is a diagram showing a server generating a start agent using information included in a key hash table.

FIG. 2 is a diagram showing server 200 generating key agent 270 using information included in key hash table 240. Server 200 uses agent generator 210 to generate key agents that are sent to remote clients, such as client A 280. Client A 280 previously authenticated server 200 using standard authentication techniques (see FIG. 1 and corresponding text for further details regarding server authentication).

Agent generator 210 uses information included in key hash table 240 to generate key agent 270. Key hash table 240 includes encryption key information corresponding to remote clients and status indicator flags corresponding to each remote client. Key hash table 240 is located in hash table store 230 which may be stored on a non-volatile storage area, such as a computer hard drive.

Key hash table 240 includes column 245 which includes client identifiers corresponding to remote clients. For example, row 265 includes client identifier "client A" which corresponds to client A 280. Column 250 includes a list of first keys corresponding to each remote client. A remote client uses a first key to decrypt remote code that has been previously encrypted (see FIGS. 1, 6, and corresponding text for further details regarding remote code decryption). Using the example described above, row 265 includes first key "1234" in which client A 280 will use to decrypt encrypted remote code.

Column 255 includes a list of second keys corresponding to each remote client. A remote client uses a second key to re-encrypt remote code that has been previously decrypted using the first key (see FIG. 1, 6, and corresponding text for further details regarding re-encrypting remote code). Using the example described above, row 265 includes second key "5678" that client A 280 will use to re-encrypt the remote code. After agent generator 210 generates and sends key agent 270 to client A 280, the second key in column 255 corresponding to client A 280 is moved to the first key column (column 250) (see FIG. 3 and corresponding text for further details regarding hash table key movement).

Key hash table 240 also includes column 260 which includes status indicator flags corresponding to each remote client. A status indicator flag is set to "pass" when a client successfully decrypts and re-encrypts remote code. The status indicator flag is set to "error" when a client does not successfully decrypt and re-encrypt remote code (see FIGS. 4, 6, and corresponding text for further details regarding verification steps). Security policies may be established so that server 200 does not send further key agents to a remote client that has a corresponding "error" status flag until the remote client's status flag has been reset to "pass."

Figure 3:
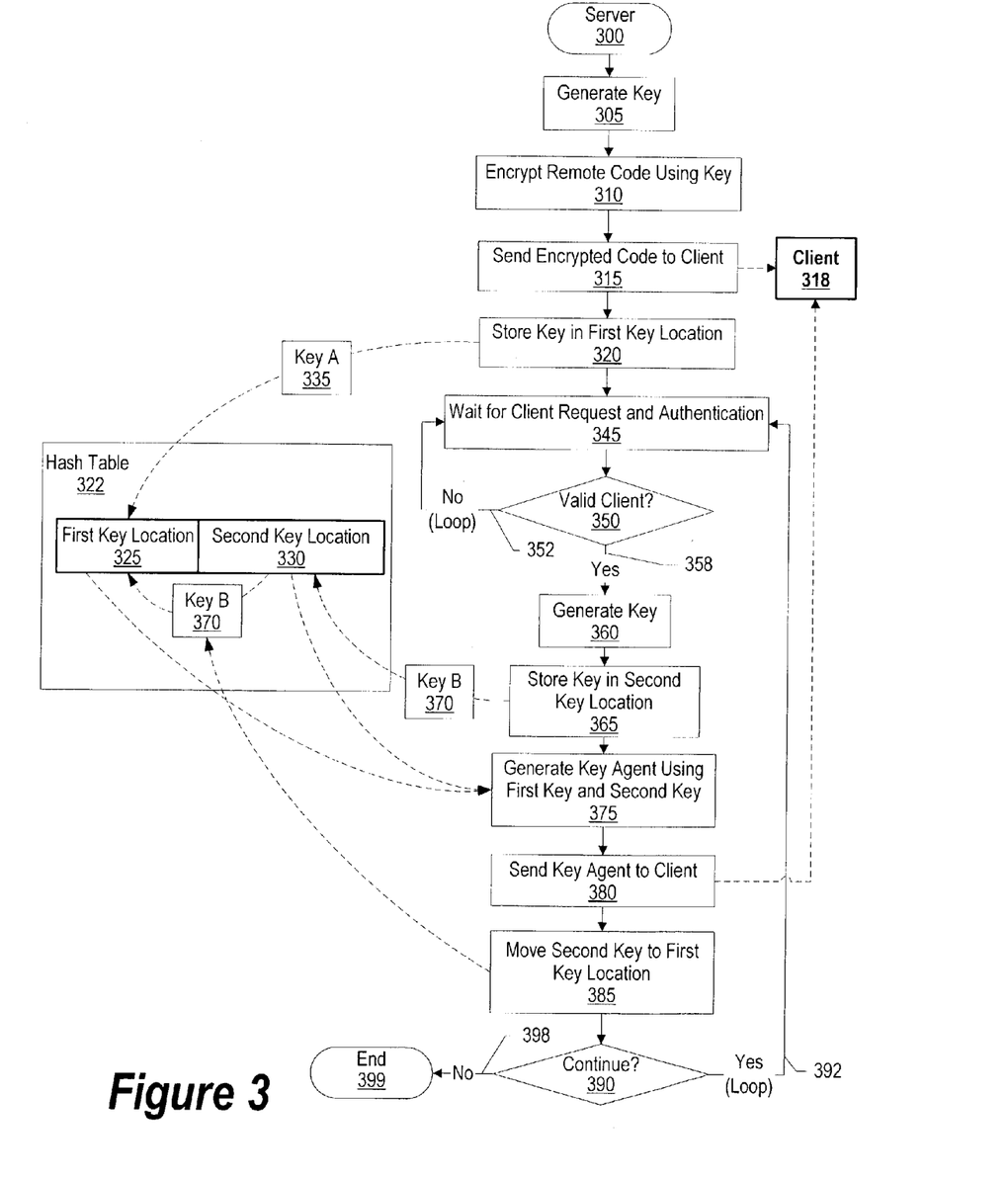
FIG. 3 is a flowchart showing a client receiving encrypted code and a start agent, and using the start agent to receive a key agent that is used to decrypt the encrypted code.

FIG. 3 is a flowchart showing steps taken in a server generating and managing encryption keys and including the encryption keys in key agents that are sent to remote clients. Processing commences at 300, whereupon processing generates a key at step 305. Processing may use a key generator program to generate keys that is typically provided with a program. For example, processing may use "libcrypto" or "Java Crypto Architecture" to generate keys. Processing encrypts remote code using the key generated in step 305 (step 310), and sends the encrypted remote code to client 318 at step 315.

Processing stores the key generated during step 305, such as key A 335, in first key location 325 which is located in hash table 322 (step 320). Hash table 322 includes a first key location and a second key location corresponding to each remote client (see FIG. 2 and corresponding text for further details regarding hash table properties). Processing waits for remote client requests and authentication at step 345 (see FIG. 1 and corresponding text for further details regarding client request and authentication steps).

When processing receives a client request and the server is authenticated, a determination is made as to whether the requesting client is valid (decision 350). For example, processing may match a requesting client's identifier with client identifiers included in hash table 322 (see FIG. 2 and corresponding text for further details regarding client identifiers). If the requesting client is not valid, decision 350 branches to "No" branch 352 which loops back to process other client requests. This looping continues until processing identifies a valid client, at which point decision 350 branches to "Yes" branch 358 whereupon processing generates a second key, such as key B 370 (step 360).

Processing stores key B 370 in second key location 330 which is located in hash table 322 (step 365). Processing generates a key agent using keys located in first key location 325 and second key location 330. At this point in the process, key A 335 is located in first key location 325 and key B 370 is located in second key location 330. Processing sends the generated key agent to client 318 at step 380.

In order to synchronize keys with client 318 for future key agent generations, processing moves the key located in second key location 330 to first key location 325 (step 385). The example in FIG. 3 shows processing moving key B 370 to first key location 325. A determination is made as to whether processing should continue (step 390). If processing should continue, decision 390 branches to "Yes" branch 392 which loops back to process more client request. This looping continues until processing should stop, at which point decision 390 branches to "No" branch 398 whereupon processing ends at 399.

Figure 4:
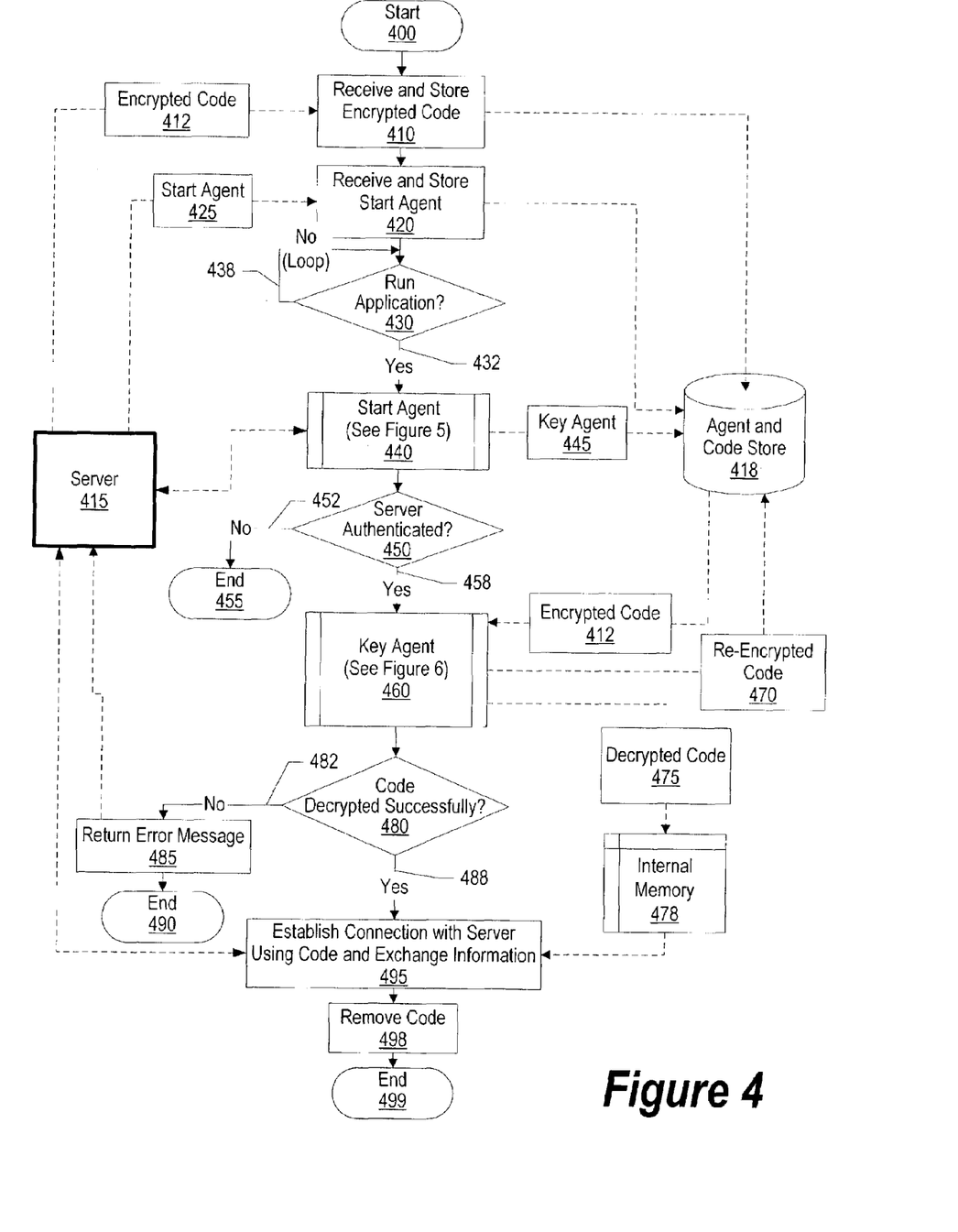
FIG. 4 is a flowchart showing steps taken in a start agent establishing a connection with a central server and receiving a key agent from the central server.

FIG. 4 is a flowchart showing a client receiving encrypted code and a start agent, and using the start agent to receive a key agent that is used to decrypt the encrypted code. Client processing commences at 400, whereupon the client receives encrypted code 412 from server 415 and stores encrypted code 412 in data store 418 (step 410). Server 415 is a server that exchanges information with the remote client. Data store 418 may be stored on a non-volatile storage area, such as a computer hard drive.

Processing receives start agent 425 from server 415 and stores start agent 425 in data store 418 (step 420). Start agent 425 includes a boot up program that processing invokes in order to run the remote code included in encrypted code 412. A determination is made as to whether the client wishes to execute the remote code included in encrypted code 412 (decision 430). If the client does not wish to execute the remote code included in encrypted code 412, decision 430 branches to "No" branch 438 which loops back to wait for further client requests. This looping continues until the client wishes to execute the remote code included in encrypted code 412, at which point decision 430 branches to "Yes" branch 432 whereupon processing invokes start agent 425 (pre-defined process block 440, see FIG. 5 and corresponding text for further details).

Start agent 425 establishes a secure (SSL) connection with server 415 and authenticates server 415 using standard authentication techniques, such as with a digital certificate. When processing authenticates server 415, processing receives key agent 445 from server 415 and stores key agent 445 in data store 418. Key agent 445 includes a first key and a second key that are used to decrypt encrypted code 412 and re-encrypt the decrypted remote code.

A determination is made as to whether server 415 was authenticated by the remote client (decision 450). If server 415 was not authenticated, decision 415 branches to "No" branch 452 whereupon processing ends at 455. On the other hand, if server 415 was authenticated, decision 450 branches to "Yes" branch 458 whereupon key agent 445 is invoked (pre-defined process block 460, see FIG. 6 and corresponding text for further details). Key agent 445 retrieves encrypted code 412 from data store 418, decrypts encrypted code 412, and stores the decrypted code, such as decrypted code 475, in internal memory 478. Internal memory 478 may be stored in a loaded class inside a Java Virtual Machine (JVM). The key agent also re-encrypts the decrypted code and stores re-encrypted code 470 in data store 418.

Figure 6:
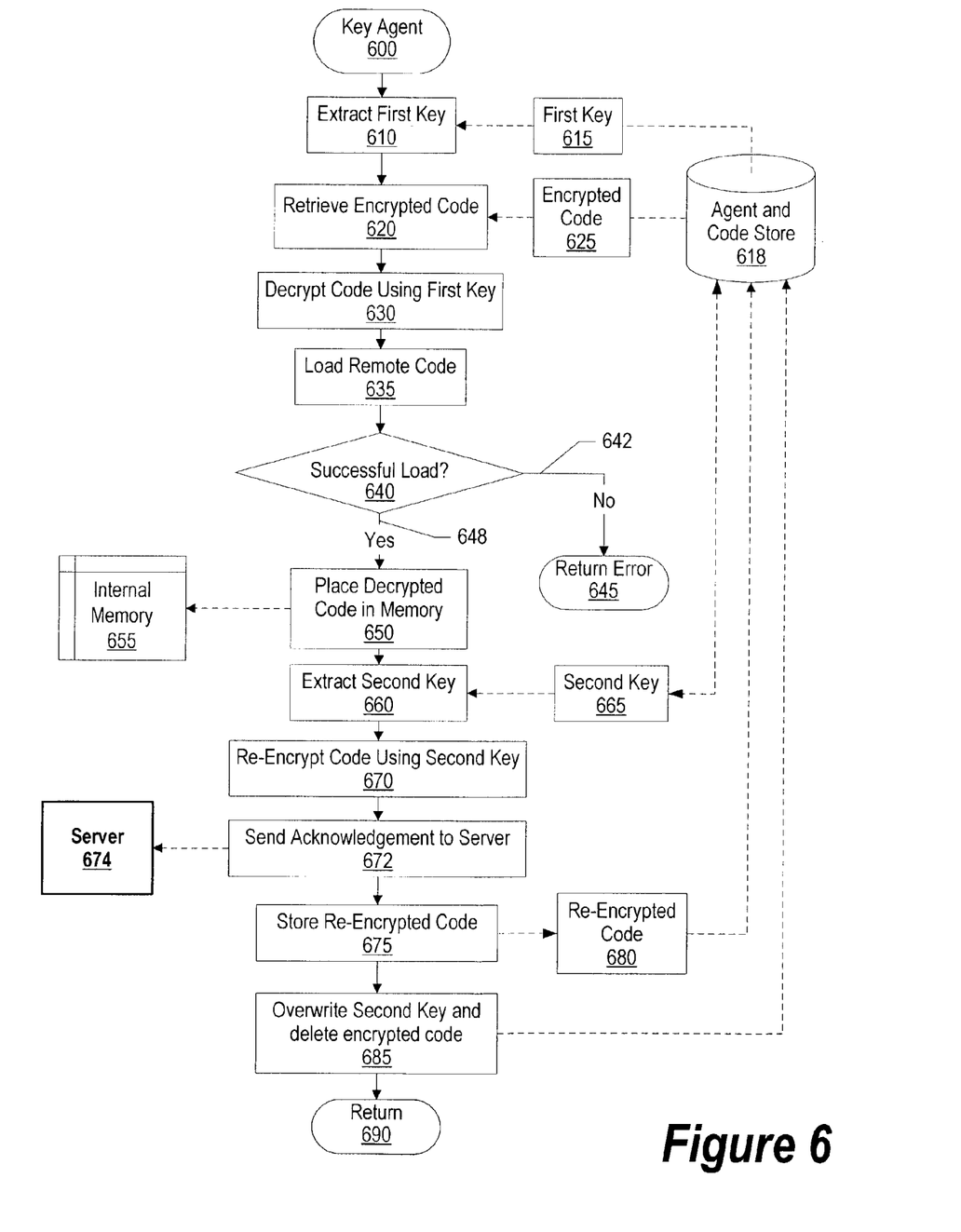
FIG. 6 is a flowchart showing steps taken in a key agent using a first key to decrypt encrypted code and using a second key to generate re-encrypted code.

A determination is made as to whether encrypted code 412 was decrypted successfully (decision 480) (see FIG. 6 and corresponding text for further details regarding successful decryption determination). If the remote code was not decrypted properly, decision 480 branches to "No" branch 482 whereupon processing returns an error message to server 415 (step 485), and processing ends at 490. Server 415 logs an entry in a key hash table corresponding to the remote client which indicates that the client did not successfully decrypt the remote code (see FIG. 2 and corresponding text for further details regarding hash table properties). On the other hand, if the code was decrypted successfully, decision 480 branches to "Yes" branch 488 whereupon processing establishes a connection with server 415 using the decrypted remote code, sends an acknowledgement message to server 415 indicating that the decryption and re-encryption process were successful, and exchanges information with server 415 (step 495). When processing finishes exchanging information with server 415, the processing removes the decrypted remote code at step 498. For example, the decrypted remote code may be stored in a JVM, and the JVM releases its volatile memory space at the end of the program's execution. Processing ends at 499.

Figure 5:
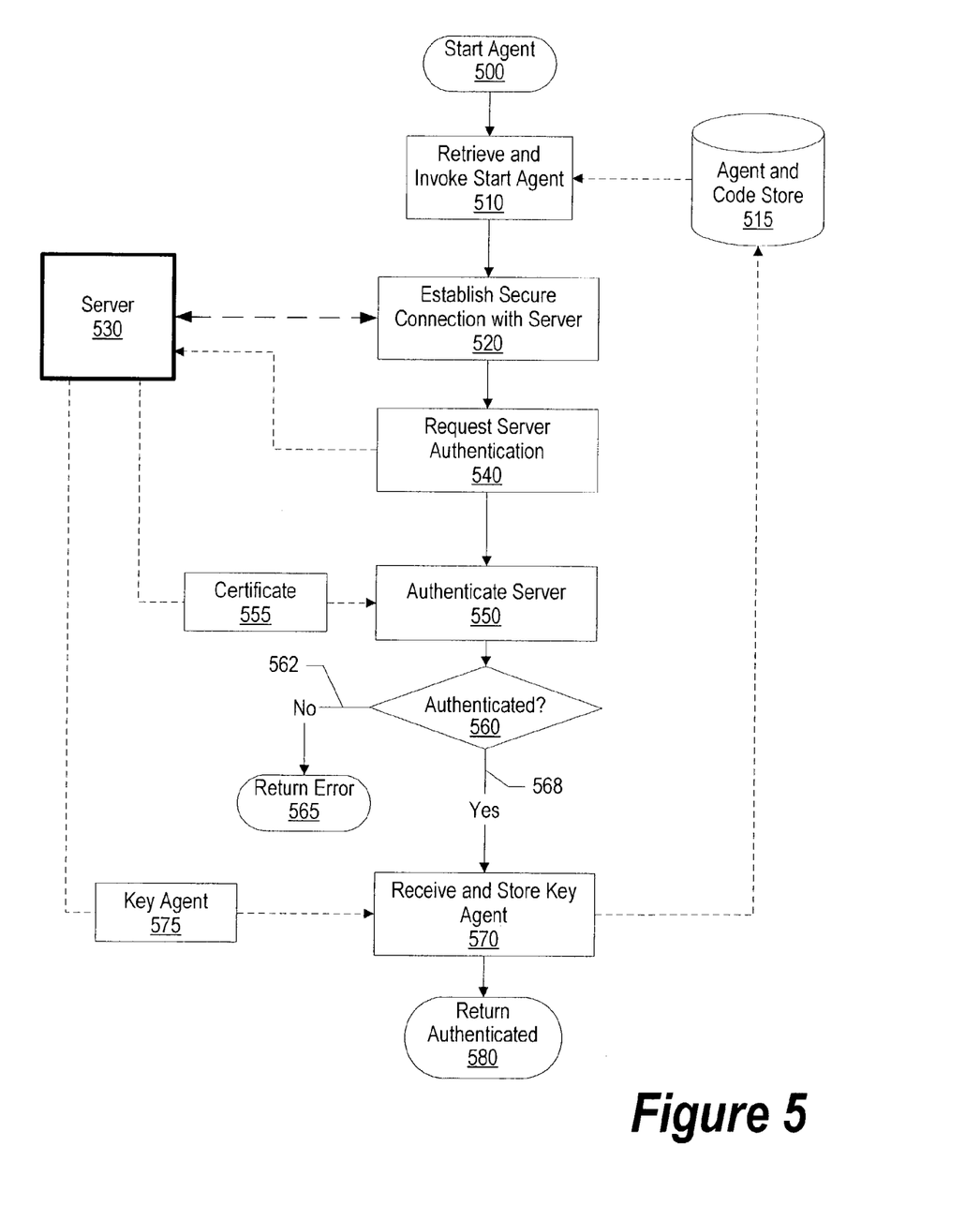
FIG. 5 is a flowchart showing steps taken in a key agent using a first key to decrypt remote code and using a second key to re-encrypt the remote code.

FIG. 5 is a flowchart showing steps taken by a start agent, located at a client, to establish a connection with a server and receive a key agent from the server. A client invokes the start agent when the client wishes to execute a particular remote code that has been encrypted (see FIG. 1 and corresponding text for further details regarding start agent execution,). Processing commences at 500, whereupon processing retrieves a start agent from data store 515, and invokes the start agent (step 510). The start agent was previously stored in data store 515 along with encrypted remote code. Data store 515 may be stored on a non-volatile storage area, such as a computer hard drive.

Processing establishes a secure connection, using a technology such as SSL, with server 530 at step 520. Server 530 is a server with which the client exchanges information. For example, server 530 may be a central banking server that collects customer transactions from a remote bank branch that the client services. Processing requests server authentication using the established secure connection at step 540. Processing receives certificate 555 from server 530 that includes information which authenticates server 530. For example, certificate 555 may include information corresponding to the X.509 standard for certification (step 550).

Processing uses standard authentication techniques to determine whether server 530 is authenticated (decision 560). For example, processing may contact a signing authority to validate server 530's digital certificate. If server 530 is not authenticated, decision 560 branches to "No" branch 562 whereupon processing returns an error at 565. On the other hand, if server 530 is authenticated, decision 560 branches to "Yes" branch 568 whereupon processing receives key agent 575 and stores key agent 575 in data store 515. Server 530 generated key agent 575 using a first key and a second key corresponding to the remote client (see FIG. 3 and corresponding text for further details regarding key agent generation). Processing returns an authentication at 580.

FIG. 6 is a flowchart showing steps taken in a key agent using first key 615 to decrypt encrypted code 625 and using second key 665 to generate re-encrypted code 680. Processing commences at 600, whereupon first key 615 is retrieved from data store 618 (step 610). First key 615 may be embedded as part of a key agent's code or may be stored in a separate memory location. Data store 618 may be stored on a non-volatile storage area, such as a computer hard drive.

Processing retrieves encrypted code 625 from data store 618 at step 620. Encrypted code 625 was previously stored prior to invoking the key agent (see FIGS. 1, 4, and corresponding text for further details regarding receiving encrypted code). Encrypted code 625 is remote code that has been encrypted at a server using first key 615. Processing decrypts encrypted code 625 using first key 615 and a decryption process that corresponds to the encryption process that was used to generate encrypted code 625 (step 630). Processing loads the decrypted remote code using a Java classloader which executes a byte-code verification process that identifies whether the remote code was properly decrypted using first key 615 (step 635).

A determination is made as to whether the remote code was successfully decrypted using results from loading the remote code (decision 640). If the remote code was not loaded successfully, decision 640 branches to "No" branch 642 whereupon an error message is returned at 645. The error message is sent to a server which logs the error in a key hash table (see FIG. 2 and corresponding text for further details regarding key hash table properties). On the other hand, if the remote code was decrypted successfully, decision 640 branches to "Yes" branch 648 whereupon processing stores the decrypted code (e.g. remote code) in internal memory 655 (step 650). Internal memory 655 may be stored in volatile memory, such as a loaded class in a Java Virtual Machine (JVM).

Processing retrieves second key 665 from data store 618 at step 660. Second key 665 may be embedded within the key agent code or may be stored in a separate memory location. Processing re-encrypts the remote code using second key 665 at step 670. The re-encryption process corresponds to the original encryption process performed at a central server as well as the decryption process performed at step 630. Processing sends an acknowledgement message to server 674 indicating that the remote code has been decrypted and re-encrypted successfully (step 672).

Processing stores re-encrypted code 680 in data store 618 at step 675. Re-encrypted code 680 is decrypted the next time the client invokes the remote code. For example, re-encrypted code 680 proceeds through a sequence of events similar to that of encrypted code 625 as described above.

For enhanced security, processing overwrites second key 665 with a random data and deletes encrypted code 625 (step 685). Once second key 665 has been overwritten and encrypted code 625 deleted, processing returns at 690.

Figure 7:
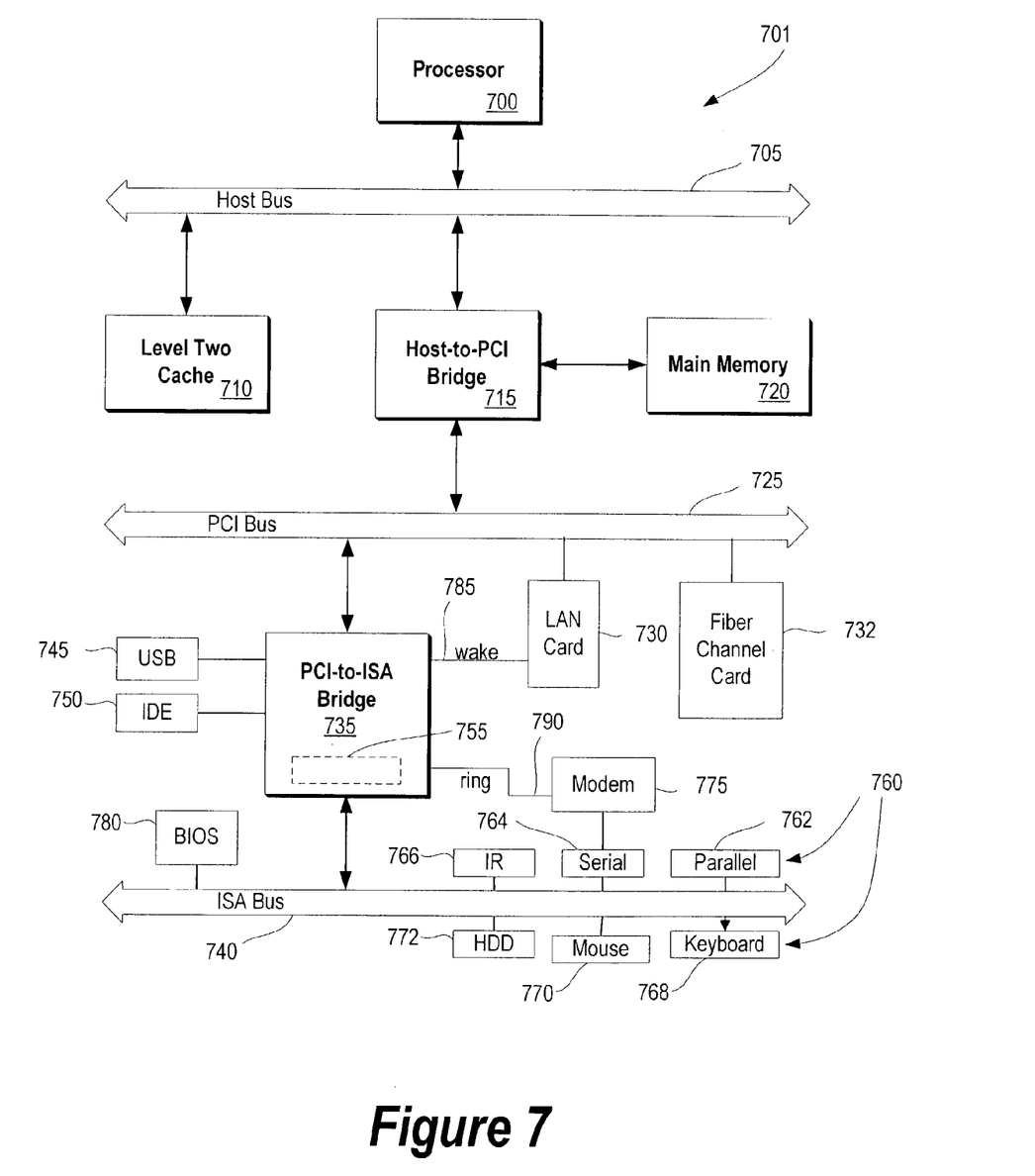
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of securing remote code at a client computer system, said method comprising:
   retrieving encrypted remote code from a storage area;
   receiving a key agent from a server computer system, wherein the key agent includes a first key arid a second key, the first key and the second key generated at the server;
   decrypting the encrypted remote code using the first key, the decrypting resulting in a decrypted remote code;
   storing the decrypted remote code in a temporary storage area;
   verifying the decrypted remote code;
   executing the decrypted remote code at the client computer system;
   removing the decrypted remote code from the temporary storage area;
   re-encrypting the decrypted remote code using the second key, resulting in a re-encrypted remote code;
   receiving, at the server computer system, an acknowledgement message indicating that the decrypted remote code was successfully loaded by the client computer system;
   copying the second key that was included with the key agent to a first key location area in response to receiving the acknowledgement message, the first key location area residing on a non-volatile storage device located at the server computer system;
   generating a third key in response to receiving the acknowledgement message;
   overwriting the second key with the third key; and
   storing the third key in the non-volatile storage device located at the server computer system.

2. The method as described in claim 1 wherein the verifying further comprises:
   loading the decrypted remote code; and
   sending an error message to the server computer system in response to unsuccessfully loading the decrypted remote code.

3. The method as described in claim 2 further comprising:
   receiving, at the server computer system, the error message; and
   changing a status flag indicator corresponding to the client computer system and the error message, wherein the status flag indicator resides on the non-volatile storage device located at the server computer system.

4. The method as described in claim 1 further comprising:
   receiving a start agent prior to receiving the key agent;
   requesting server authentication from the server computer system using the start agent;
   receiving a digital certificate from the server computer system in response to the requesting;

authenticating the server computer system using the digital certificate; and
receiving the key agent in response to the authentication.

5. An information handling system comprising:
one or more processors;
a memory accessible by the processors;
one or more nonvolatile storage devices accessible by the processors; and
a remote code security tool to secure remote code, the remote code security tool including:
means for retrieving encrypted remote code from one of the nonvolatile storage devices;
means for receiving a key agent from a server computer system over a computer network, wherein the key agent includes a first key and a second key, the first key and the second key generated at the server;
means for decrypting the encrypted remote code using the first key, resulting in a decrypted remote code;
means for storing the decrypted remote code in the memory;
means for verifying the decrypted remote code;
means for executing the decrypted remote code at the information handling system;
means for removing the decrypted remote code from the memory;
means for re-encrypting the decrypted remote code using the second key, resulting in a re-encrypted remote code;
means for receiving, at the server computer system, an acknowledgement message indicating that the decrypted remote code was successfully loaded by the client computer system;
means for copying the second key that was included with the key agent to a first key location area in response to receiving the acknowledgement message, the first key location area residing on a non-volatile storage device located at the server computer system;
means for generating a third key in response to receiving the acknowledgement message;
means for overwriting the second key with the third key; and
means for storing the third key in the non-volatile storage device located at the server computer system.

6. The information handling system as described in claim 5 wherein the verifying further comprises:
means for loading the decrypted remote code; and
means for sending an error message to the server computer system over the computer network in response to unsuccessfully loading the decrypted remote code.

7. The information handling system as described in claim 6 further comprising:
means for receiving, at the server computer system, the error message; and
means for changing a status flag indicator corresponding to the information handling system and the error message, wherein the status flag indicator resides on the nonvolatile storage device located at the server computer system.

8. The information handling system as described in claim 5 further comprising:
means for receiving a start agent prior to receiving the key agent;
means for requesting server authentication from the server computer system using the start agent;
means for receiving a digital certificate from the server computer system over the computer network in response to the requesting;
means for authenticating the server computer system using the digital certificate; and
means for receiving the key agent over the computer network in response to the authentication.

9. A computer program product stored on a computer operable media for performing remote code integrity at a client computer system, said computer program product comprising:
means for retrieving encrypted remote code from a storage area;
means for receiving a key agent from a server computer system over a computer network, wherein the key agent includes a first key and a second key, the first key and the second key generated at the server;
means for decrypting the encrypted remote code using the first key, resulting in a decrypted remote code;
means for storing the decrypted remote code in a temporary storage area;
means for verifying the decrypted remote code;
means for executing the decrypted remote code at the client computer system;
means for removing the decrypted remote code from the temporary storage area;
means for re-encrypting the decrypted remote code using the second key, resulting in a re-encrypted remote code;
means for receiving, at the server computer system, an acknowledgement message indicating that the decrypted remote code was successfully loaded by the client computer system;
means for copying the second key that was included with the key agent to a first key location area in response to receiving the acknowledgement message, the first key location area residing on a non-volatile storage device located at the server computer system;
means for generating a third key in response to receiving the acknowledgement message;
means for overwriting the second key with the third key; and
means for storing the third key in the non-volatile storage device located at the server computer system.

10. The computer program product as described in claim 9 wherein the verifying further comprises:
means for loading the decrypted remote code; and
means for sending an error message to the server computer system in response to unsuccessfully loading the decrypted remote code.

11. The computer program product as described in claim 10 further comprising:
means for receiving, at the server computer system, the error message; and
means for changing a status flag indicator corresponding to the client computer system and the error message, wherein the status flag indicator resides on the non-volatile storage device located at the server computer system.

12. The computer program product as described in claim 9 further comprising:
means for receiving a start agent prior to receiving the key agent;
means for requesting server authentication from the server computer system using the start agent;
means for receiving a digital certificate from the server computer system in response to the requesting;
means for authenticating the server computer system using the digital certificate; and
means for receiving the key agent in response to the authentication.

* * * * *